(12) United States Patent
Manders et al.

(10) Patent No.: US 6,652,023 B2
(45) Date of Patent: Nov. 25, 2003

(54) OPEN ROOF CONSTRUCTION FOR A VEHICLE

(75) Inventors: Peter Christiaan Leonardus Johannes Manders, Horst (NL); Egbert Boersma, Helmond (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/115,586

(22) Filed: Apr. 3, 2002

(65) Prior Publication Data

US 2002/0167204 A1 Nov. 14, 2002

(30) Foreign Application Priority Data

Apr. 3, 2001 (NL) .......................................... 01201206

(51) Int. Cl.$^7$ ................................................ B60J 7/057
(52) U.S. Cl. .............. 296/223; 296/216.01; 296/216.04
(58) Field of Search ............................ 296/210, 216.04, 296/216.01, 216.07, 216.08, 220.01, 222, 223, 221, 218

(56) References Cited

U.S. PATENT DOCUMENTS

| | | | |
|---|---|---|---|
| 4,974,902 A | | 12/1990 | Huiyer ........................ 296/223 |
| 5,335,961 A | * | 8/1994 | Reinsch et al. .............. 296/223 |
| 5,791,728 A | * | 8/1998 | Hausrath ..................... 296/223 |
| 5,899,524 A | | 5/1999 | Mori et al. .................. 296/222 |
| 6,050,632 A | * | 4/2000 | Aoki et al. .................. 296/223 |
| 6,129,413 A | | 10/2000 | Klein ..................... 296/220.01 |
| 6,158,803 A | * | 12/2000 | Reihl et al. ................. 296/223 |

FOREIGN PATENT DOCUMENTS

| | | |
|---|---|---|
| DE | 3424334 A1 | 1/1986 |
| DE | 196 54 588 A1 | 11/1987 |
| DE | 199 41 984 C1 | 10/2000 |
| EP | 0 321 003 A1 | 6/1989 |
| GB | 2 090 630 A | 7/1982 |

* cited by examiner

*Primary Examiner*—Joseph D. Pape
*Assistant Examiner*—Lori L Coletta
(74) *Attorney, Agent, or Firm*—Westman, Champlin & Kelly, P.A.; S. Koehler (57) ABSTRACT

An open roof construction for a vehicle having a roof opening includes a closure element for the roof opening, which is driven by a driving element. The closure element can be locked in at least one position with respect to the vehicle, whilst the driving element can be disconnected from the closure element in that position for the purpose of driving another element. A coupling arm is pivotally connected to the closure element and engages the driving element. The coupling arm, in a first pivoted position thereof, is substantially rigidly connected to the driving element, and in a second pivoted position the closure element is fixed in position with respect to the vehicle the guide, whilst on the other hand the driving element is made movable with respect to the coupling arm and the closure element.

19 Claims, 10 Drawing Sheets

OPEN ROOF CONSTRUCTION FOR A VEHICLE

BACKGROUND OF THE INVENTION

The invention relates to an open roof construction for a vehicle, having a roof opening formed in the roof of the vehicle and comprising at least one closure element, which is movable along a guide between a position in which it closes the roof opening and a position in which it releases the roof opening, wherein a driving mechanism is used for the closure element, which driving mechanism comprises a driving source and at least one driving element which couples said driving source to said closure element, which closure element can be locked in at least one position with respect to said guide, whilst the driving element can be disconnected from said closure element in said position and be moved with respect thereto for the purpose of driving another element that forms part of the open roof construction.

Examples of prior art open roof constructions of this type are to be found in, for example, German Offenlegungsschrift Nos. 3424334 and 19654558 and in U.S Pat. No. 4,974,902.

SUMMARY OF THE INVENTION

It is an object of the present invention to further improve an open roof construction of the present type.

In order to accomplish that objective, the open roof construction includes a coupling arm present between said closure element and said driving element, which coupling arm is pivotally connected to said closure element with one end and which engages said driving element with its other end, in such a manner that the coupling arm, in a first pivoted position thereof, is substantially rigidly connected to the driving element, whilst in a second pivoted position of the coupling arm the closure element is on the one hand fixed in position with respect to said guide, whilst on the other hand the driving element becomes movable with respect to the coupling arm and the closure element.

In this way an effective, reliable construction is provided, by means of which the driving element is given an additional driving function.

It is noted that a variant wherein the coupling arm is pivotally connected to the driving element with one end and engages the closure element with its other end merely constitutes a kinematic reversal and consequently falls within the scope of the present invention as well.

In an advantageous embodiment of the open roof construction according to the invention, the selective movability of the coupling arm with respect to the driving element is effected in that the driving element includes a slide provided with an elongated groove, in which a slide block which is connected to the coupling arm is accommodated, wherein the groove and the slide block are so designed that movement of the slide block within said groove is not possible in the first pivoted position of the coupling arm, whereas such movement is possible indeed in the second pivoted position.

The coupling arm can be moved to its first and its second pivoted position in an advantageous manner in that the coupling arm carries a locking projection, which is moved through said guide for the purpose of defining said first pivoted position, and which is capable of engaging in a locking recess in the fixed roof construction of the vehicle, for example in said guide, in said second pivoted position so as to fix the closure element with respect to the guide, wherein the groove of said slide comprises a straight first portion having straight walls, which extends substantially parallel to said guide, and an adjoining second portion having sloping walls, which includes an angle with said straight portion, wherein the slide block is adapted or shaped, for example in a diamond-shaped, to be present in said second groove portion in the first pivoted position of the coupling arm, being rigidly connected to the slide by the sloping walls thereof, and wherein said slide block is positioned in said first groove portion in said second pivoted position, in which position it is capable of movement between the straight walls thereof.

When the locking projection of the coupling arm is being moved through the guide, the slide block is positioned in the second groove portion. In this position, the driving force that is exerted by the driving element can be transmitted to the slide block via the sloping walls, and consequently to the closure element via the coupling arm. In this manner, the driving element is connected to the closure element.

The sloping groove walls exert a force component on the slide block, which attempts to move the slide block out of the second groove portion. The co-operation between the locking projection and the guide prevents such movement of the slide block and the resulting pivoting movement of the coupling arm, however. When the locking projection reaches the aforesaid locking recess in the fixed roof construction, for example in the guide, however, said force component will cause the slide block to move, whereby the locking projection will engage in said locking recess. On the one hand, this will cause the coupling arm, and thus also the closure element, to be fixed in position with respect to the fixed roof construction. In addition, however, the slide block will move from the second groove portion to the first groove portion, thus enabling the slide to move with respect to the slide block. The slide block thus moves into the first groove portion.

Herein before it has been described how the closure element can be locked in at least one position, whilst the driving element can be disconnected from the closure element in that position. It is also possible, however, to achieve a comparable effect in yet another position of the closure element. In such a case the coupling arm can also take up a third pivoted position, in which movement of the driving element with respect to the coupling arm and the closure element becomes possible, and in which position the direction of the movement of the driving element on the one hand and the coupling arm and the closure element on the other hand with respect to each other is opposed to the direction of the relative movement of said parts in the second pivoted position.

This can be effected, for example, in that the groove comprises two straight groove portions adjoining the second groove portion on opposite sides thereof, wherein the slide block of the coupling arm is present in one straight groove portion in its second pivoted position, whilst it is present in the other straight groove portion in its third pivoted position. Preferably, the coupling arm will furthermore carry a second locking projection in such a case, which mates with an additional locking recess in the fixed roof construction in an similar manner.

In a practical embodiment of the open roof construction according to the invention, a second closure element is used, which can be driven together with the first closure element by the driving element, and which, in the position in which the first closure element is locked in position with respect to the guide, can be moved with respect to the first closure element by the driving element, which is likewise movable with respect to the first closure element in that position. Thus the two closure elements may first be moved to the position in which they close the roof opening, for example, after which the second closure element is moved back slightly with respect to the first closure element, in order to form an opening between the two closure elements, for example for the purpose of obtaining pressure equalization.

Such a manner of driving the second closure element with respect to the first closure element can be effected, for example, when the driving element is returned to said second closure element, to which it is connected, in a looped path through said first closure element. As long as the coupling arm is in its first pivoted position and the driving element is connected to said first closure element, the driving element and the first closure element will not move with respect to each other, and neither will the first and second closure elements, therefore. When the coupling arm has left its first pivoted position and the driving element is capable of movement with respect to the first closure element, however, said movement is returned to the second closure element in reverse direction via the looped portion of the driving element, which second closure element will subsequently move in a direction opposed to the original direction of movement of the first closure element so as to space the two closure elements apart.

As already briefly indicated before, said one position may be the position in which the closure element closes the roof opening.

When, as already said before, a second closure element is used, it is advantageous to use an embodiment of the open roof construction wherein the second closure element can be moved from the closing position to the releasing position along the same guide as the first closure element, wherein lateral guides connect to said guides, into which the second closure element can be moved to its releasing position so as to place the two closure elements in an overlapping position adjacently to each other, and wherein the second closure element is connected to the driving element in such a manner that when said second closure element is accommodated in said lateral guides, the driving element can move with respect to the second closure element.

Initially, the two closure elements move from the closing position to the releasing position. Then the second closure element moves into the lateral guides and remains stationary therein. The first closure element then continues its movement beside the second closure element. Once the second closure element has arrived in the lateral guides, the driving element is disconnected from said second closure element.

Said disconnection can be effected, for example, in that the driving element engages in a channel formed in the second closure element by means of a connecting arm, in such a manner that when the second closure element is positioned in the lateral guides, said connecting arm will move through said channel upon movement of the first closure element to the position in which it overlaps the second closure element, and wherein said connecting arm strikes against a channel end upon movement of the first closure element in the opposite direction, thus carrying the second closure element along with the first closure element.

During the movement of the two closure elements from the closing position to the releasing position, the movement of the connecting arm in the channel makes it possible for the first closure element to continue its movement beside the second closure element once the second closure element has reached the lateral guides. In this manner an overlapping, compact position of the two closure elements is effected. In reverse direction, during movement from said releasing position to said closing position, the second closure element will initially remain stationary until the connecting arm strikes against the channel end in question and the second closure element is pulled out of the lateral guides into the guide, from where it will move along with the first closure element to the closing position.

The movement of the second closure element in the lateral guides can be effected in that the lateral guides are formed by two inclined recesses of different length, whilst the second closure element is fitted with two correspondingly dimensioned guide shoes, wherein said recesses and said guide shoes are so positioned that during movement of the second closure element to the releasing position, the longer guide shoes first pass the shorter recesses before the longer guide shoes reach the longer recesses and the shorter guide shoes reach the shorter recesses.

Said closure element (or elements) may be a sun screen, for example.

The invention furthermore relates to an open roof construction of the present type, comprising a wind deflector which is pivotable between an inoperative position, in which it lies substantially in the plane of the roof, and an operative position, in which it slopes upwards from said plane, which wind deflector is spring-loaded to the operative position, and which engages, at least in its operative position, a stop which can be moved by the movement of the closure element. In accordance with the invention, this open roof construction comprises a curved member which can be driven by the driving element, a first curved portion of which mates with a spring member providing said spring load, and a second curved portion of which mates with a cam disposed on the wind deflector, which determines the pivoting angle that is caused by the spring load.

In principle the movable stop determines the pivoted position of the wind deflector, as is well-known. Once the stop has been moved, however, the cam that is disposed on the wind deflector will mate with the second curved portion of the curved member. The spring member that mates with the first curved portion also determines the spring load that is exerted on the wind deflector. Said spring load can be adjusted by suitably moving the curved member, therefore, it can for example be increased at high vehicle speeds. Nevertheless, it remains possible to pivot the wind deflector back against said spring load towards its inoperative position. The cam is moved clear of the second curved portion thereby. In other words, the spring member urges the cam against the second curved portion in such a situation.

Finally it is possible for the connection between the driving element and the curved member to comprise a spring member. In this way the curved member can be moved against the force of said spring member with respect to the driving element, which may be advantageous when the wind deflector is to be removed or maintenance work is to be carried out.

BRIEF DESCRIPTION OF THE DRAWING

The invention will now be explained in more detail with reference to the drawing, which shows a few embodiments of the open roof construction according to the invention. In the drawing.

DETAILED DESCRIPTION OF THE ILLUSTRATIVE EMBODIMENT

Figure 1:
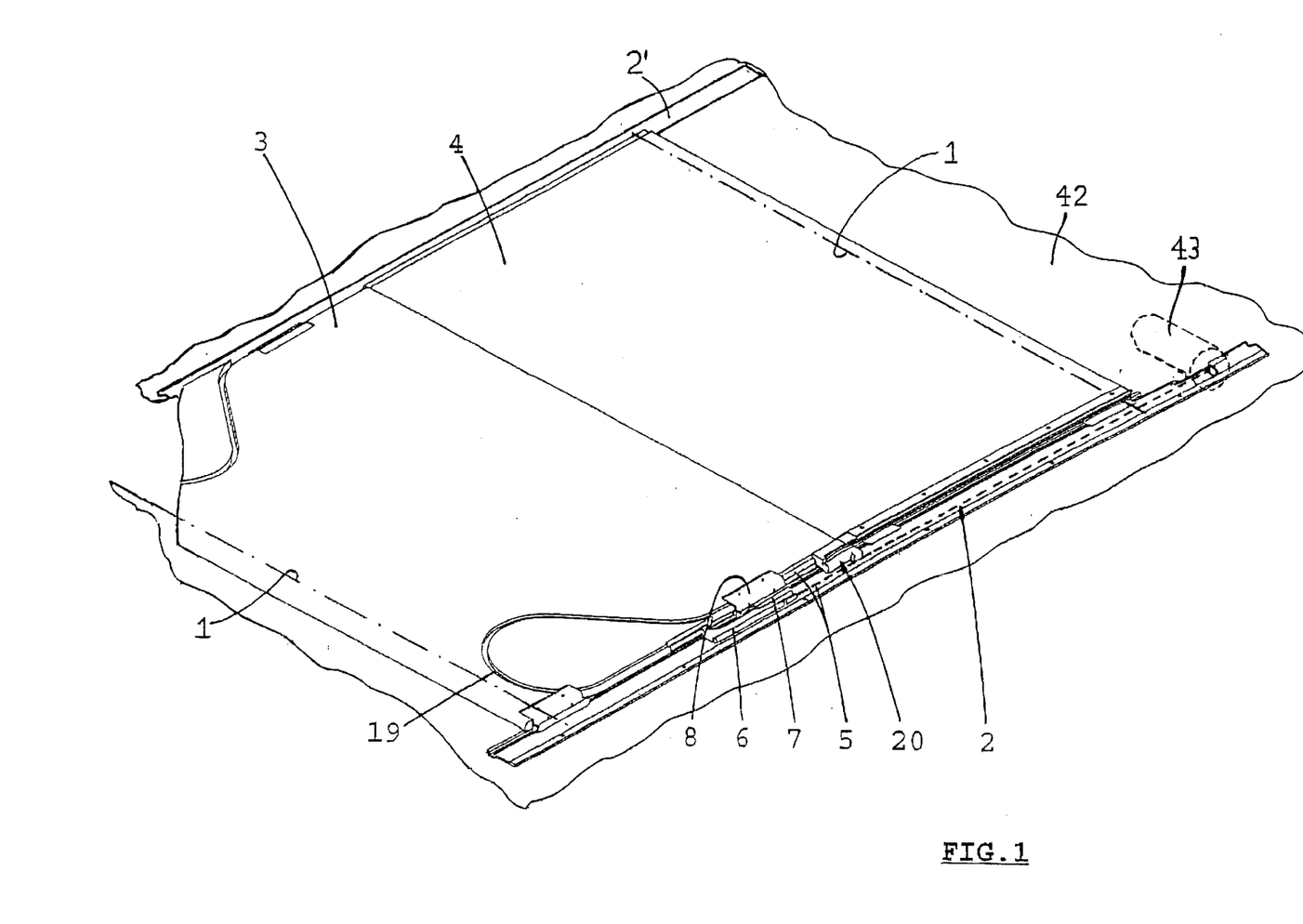
FIG. 1 is a perspective overview of an embodiment of the open roof construction according to the invention, showing the closed position thereof.

Referring to FIG. 1, there is shown a part of an open roof construction or assembly for a vehicle. A roof opening 1 is formed in the roof 42 of a vehicle in a well-known manner. Said roof opening 1 is flanked by two guides 2 that form part of the fixed roof construction (one of which (2') is shown only schematically in FIG. 1). Two closure elements, viz. a front closure element 3 and a rear closure element 4, are movable along guides 2 by means of suitable guide elements (not shown in detail) in the illustrated embodiment. In order to effect said movement, a driving mechanism is used which, as is known per se for this type of open roof constructions, employs a driving element 5 (indicated by a dotted line in FIG. 1), which is connected to a driving source 43, for example an electric motor or a hand crank. Driving element 5 preferably consists of a pull-push cable.

In the illustrated embodiment, said closure elements 3 and 4 may be sun screens. In such a case the roof opening 1 is actually closed (that is, to keep out the outside air) by means of a closing panel (not shown), whose operation is not necessarily different from that of other closing panels, so that a more detailed description thereof is not necessary within the framework of the present invention. It is absolutely possible, however, to use the illustrated closure elements 3 and 4 themselves as closing panels for roof opening 1.

Figure 2:
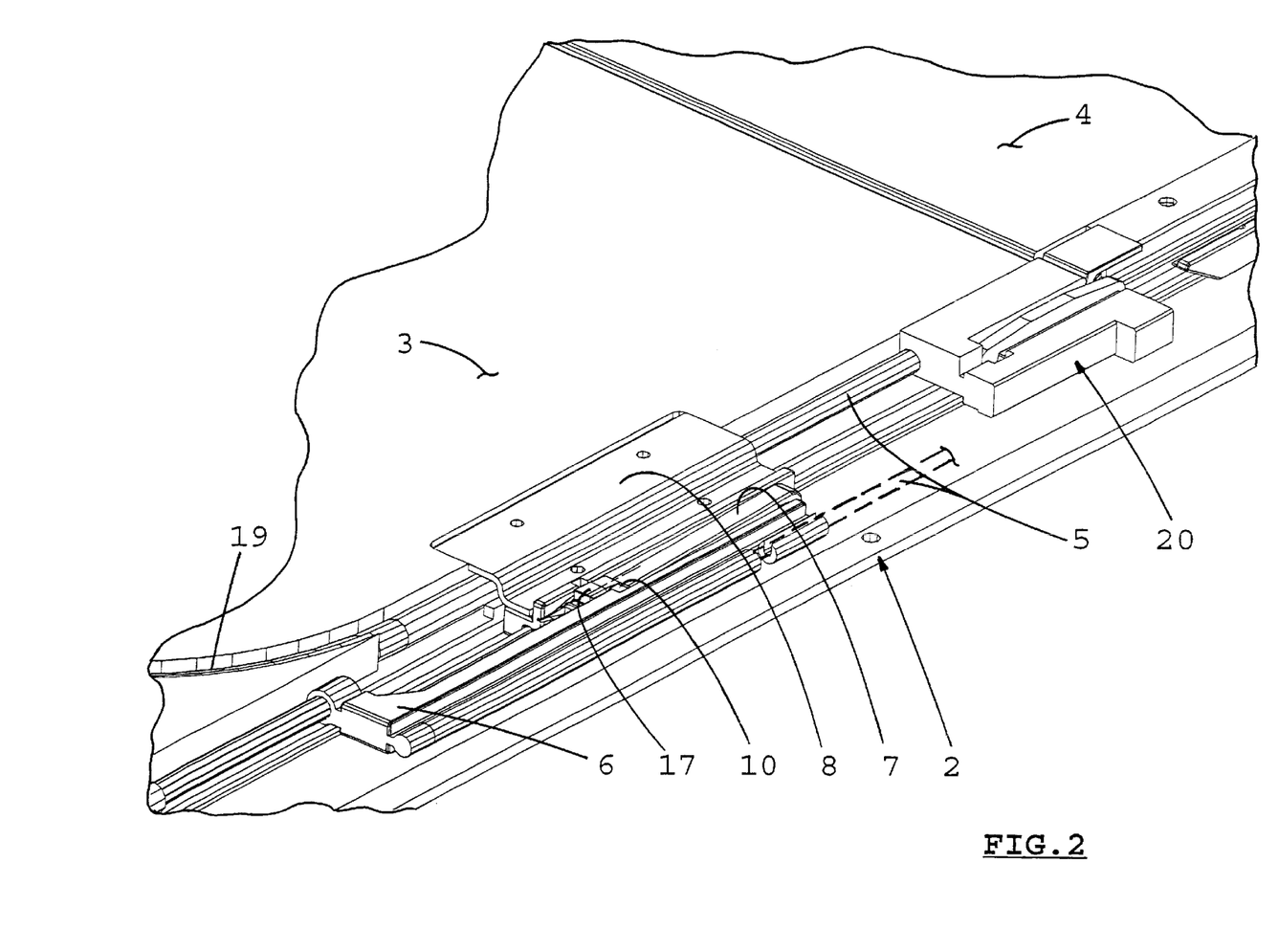
FIG. 2 is a perspective, larger-scale view of the connection between a driving element and a closure element.
Figures 3, 4:
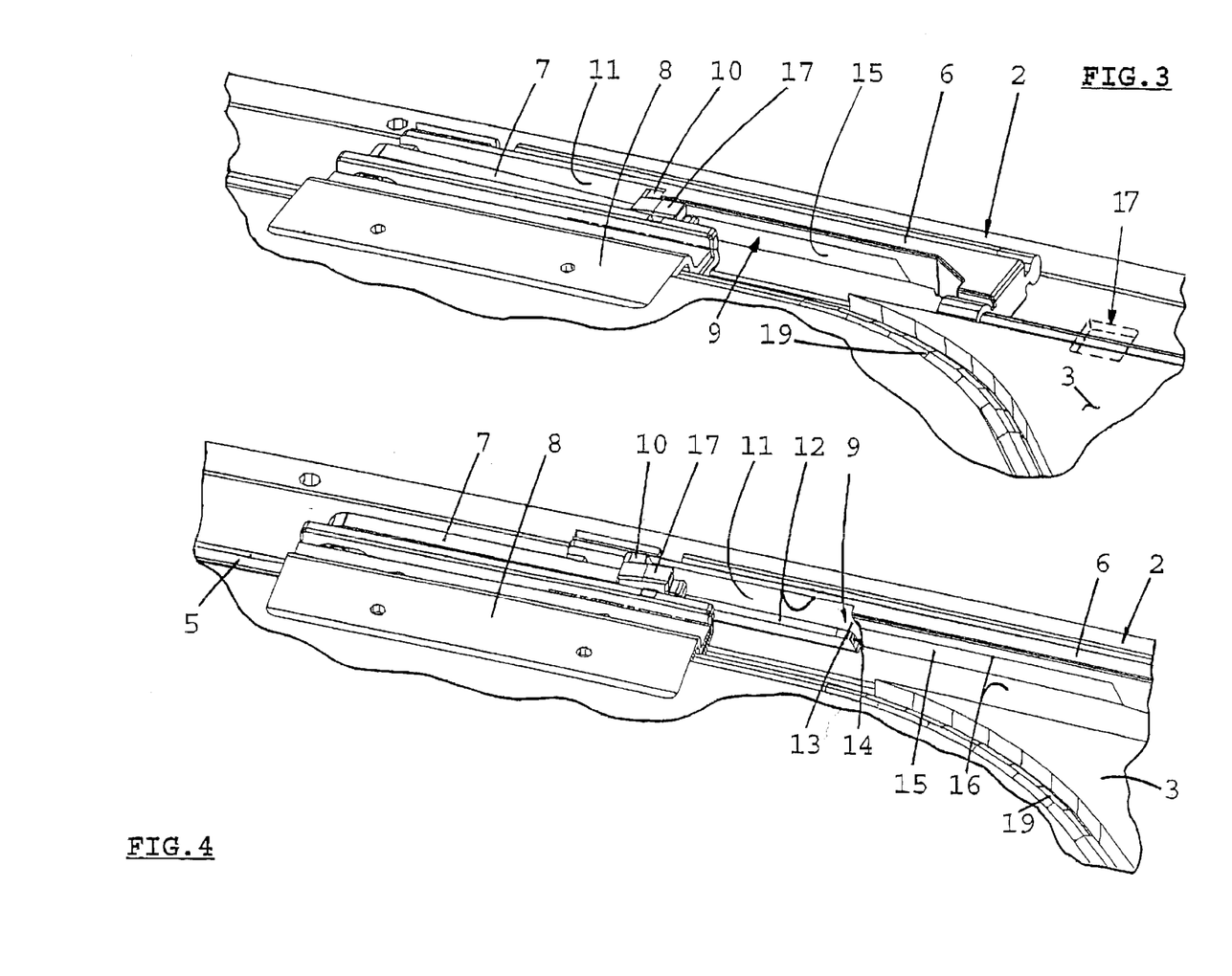
FIG. 3 is a view from another direction of the connection of FIG. 2, wherein the connection is shown in a first position thereof.
FIG. 4 is a view corresponding to FIG. 3, wherein the connection is shown in a second position thereof.

As clearly appears in particular from FIGS. 2–4, driving element 5 includes a slide 6 (in this embodiment said slide is fixedly connected to the pull-push cable). Slide 6 is coupled, by means of a coupling arm 7, to an extension 8 connected to the front closure element 3. Coupling arm 7 is pivotally connected to the front closure element 3 with one end, and it engages slide 6 with its other end.

The co-operation between coupling arm 7 and slide 6 can best be illustrated with reference to FIGS. 3 and 4. Slide 6 includes an elongated groove 9, which accommodates a slide block 10 that is connected to the respective end of the coupling arm 7. In the illustrated embodiment, groove 9 comprises a straight first groove portion 11 having straight walls 12, which extends substantially parallel to guide 2, and an adjoining second groove portion 13 having sloping walls 14, which includes an angle with said straight groove portion 11, and a third groove portion 15 having straight walls 16, wherein the slide block 10, which in the illustrative embodiment is diamond-shaped, is present in said second groove portion 13 in the first pivoted position of the coupling arm 7, being rigidly connected to the slide 6 by the sloping walls thereof, and wherein said slide block 10 is present in said first groove portion 11 in the second pivoted position, being capable of movement between the straight walls thereof.

Slide block 10 of coupling arm 7 is adapted or shaped to match the shape of the sloping groove portion 13 having sloping walls 14. Furthermore, a locking projection 17 is disposed beside slide block 10 on the end of coupling arm 7 in question.

During movement of the front closure element 3 along guide 2, locking projection 17 engages the inside of guide 2 or other similar element forming part of the fixed roof construction. This causes the coupling arm 7 to take up the position that is shown in FIG. 3, wherein the slide block 10 is present in the second groove portion 13, engaging the sloping walls 14 with two sides of its diamond shape. In this way, a force being exerted by driving element 5 is transmitted to the diamond-shaped slide block 10, and consequently to the coupling arm 7, by the sloping walls 14 and, via the extension 8, to the front closure element 3, which can thus be moved in guide 2.

Although a force component directed perpendicularly to the longitudinal direction of guide 2 is exerted on slide block 10 as well, due to the inclined position of the sloping walls 14, which force component attempts to move slide block 10 out of the second groove portion 13 in the direction of one of the straight groove portions 11 or 15 (depending on the direction of the force being exerted by the driving element 5), such movement is prevented, as already said before, in that locking projection 17 is retained in guide 2.

Figures 5, 6:
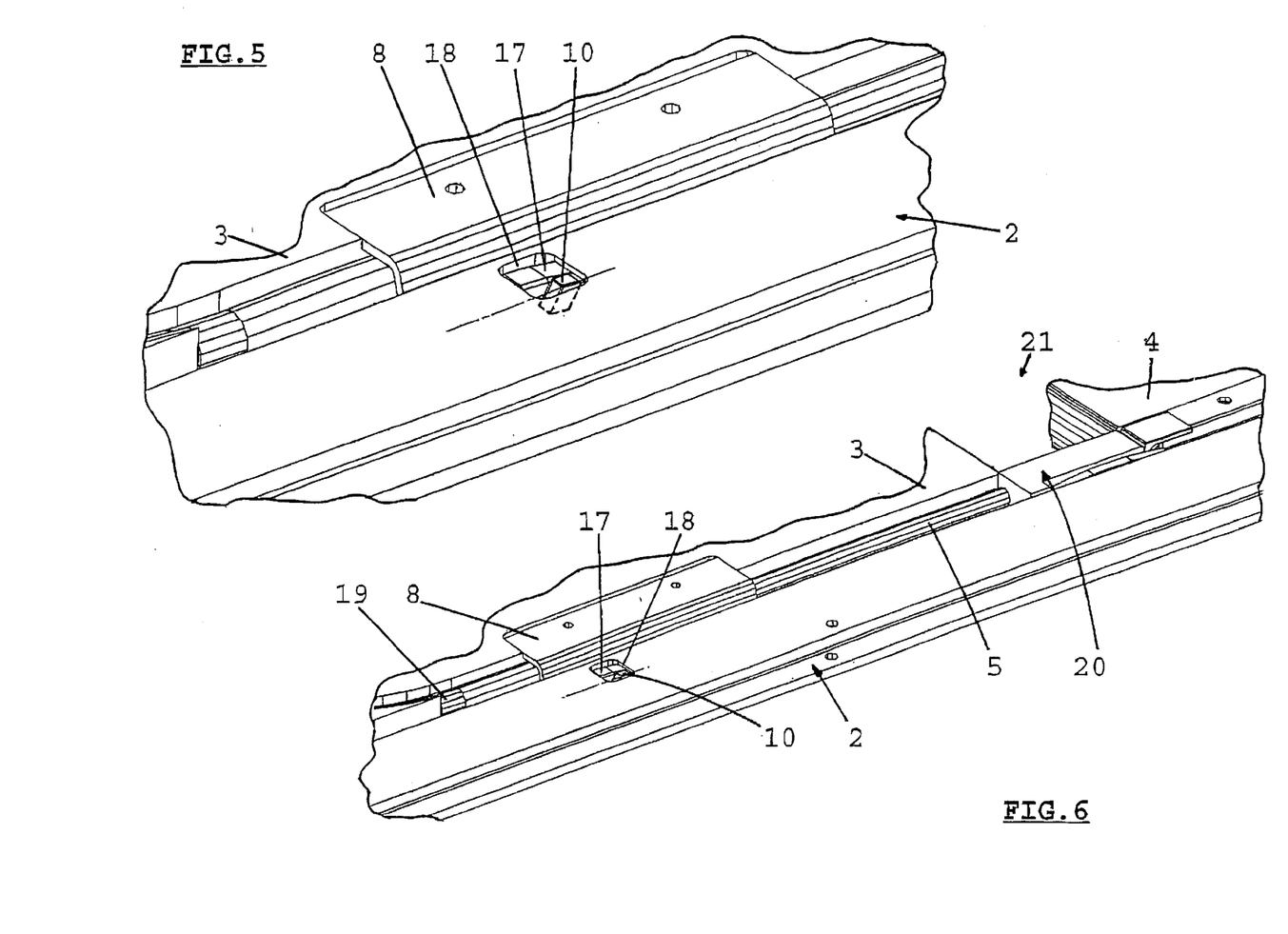
FIG. 5 shows a detail of the open roof construction comprising a locking projection.
FIG. 6 likewise shows a detail of the open roof construction comprising a locking projection.

Reference is now made to FIGS. 5 and 6. A locking recess 18 is formed in guide 2. When slide 6, in which the slide block 10 is present, reaches said locking recess 18, said slide block 10 can move along the sloping walls 14 under the influence of the aforesaid force component, whereby locking projection 17 falls into said locking recess 18. As a result, coupling arm 7, and consequently the front closure element 3, is fixed in position with respect to guide 2 (and consequently with respect to the fixed roof construction). On the other hand, however, slide block 10 has moved out of the second groove portion 13 into (in this example) the straight groove portion 11, so that a force that is exerted on slide 6 by the driving element 5 can no longer be transmitted to slide block 10, since the slide block 10 will move within the straight groove portion 11. This means that the front closure element 3 and the coupling arm 7 remains stationary, while slide 6 continues its movement.

It is noted that the other straight groove portion 15 can be used in a corresponding manner when an opposite side of the locking projection 17 falls into another locking recess 17' (FIG. 3) that is disposed on an opposite side or end of the fixed roof construction such as the guide 2.

Referring back to FIG. 1, a looped guide 19 for driving element 5 is shown to be formed in the front closure element 3. In this way the driving element 5 is returned in a looped path through the front closure element 3 to the rear closure element 4, to which it is connected by means of a connecting element 20 yet to be described in more detail (also refer to FIG. 2 and FIG. 6).

The operation is as follows: when the front closure element 3 and the rear closure element 4 are moved from an position (not shown) in which they release the roof opening to a position in which they close said roof opening 1, the coupling arm 7 initially takes up in the position that is shown in FIG. 3. In this position the driving element 5 is rigidly connected to the front closure element 3 in the previously described manner. In that situation the rear closure element 4 also occupies a fixed position with respect to the front closure element 3 via the looped guide 19 and the connecting element 20.

Once it has reached the locking recess 18, the coupling arm 7 moves to the position that is shown in FIG. 4, thus locking the front closure element 3 in position, whilst slide 6, which is driven by driving element 5, continues its movement. Via the looped guide 19, said continued movement of the driving element 5 is transmitted to connecting element 20, as a result of which the rear closure element 4 moves back (to the right in FIG. 1), 50 that a gap 21 (FIG. 6) is formed between the front closure element 3 and the rear closure element 4. Such a gap may be of importance with a view to obtaining pressure equalization between the interior of the vehicle and the outside atmosphere. In reverse direction, the rear closure element 4 is moved to the left from the position that is shown in FIG. 6, until it abuts against the front closure element 3. By that time the slide block 10 that is present in the straight groove portion 11 will have moved so far that the sloping sides of the slide block 10 start to mate with the sloping walls 14, as a result of which a force component is exerted on slide block 10, which causes the slide block 10 to be moved out of locking recess 18 and into the second groove portion 13. As a result, the front closure element 3 is disconnected from the fixed roof construction and fixedly connected to the driving element 5, after which the assembly consisting of front closure element 3 and rear closure element 4 moves ahead in the direction of the position in which they release the roof opening (to the right in FIG. 1).

Figures 7, 8:
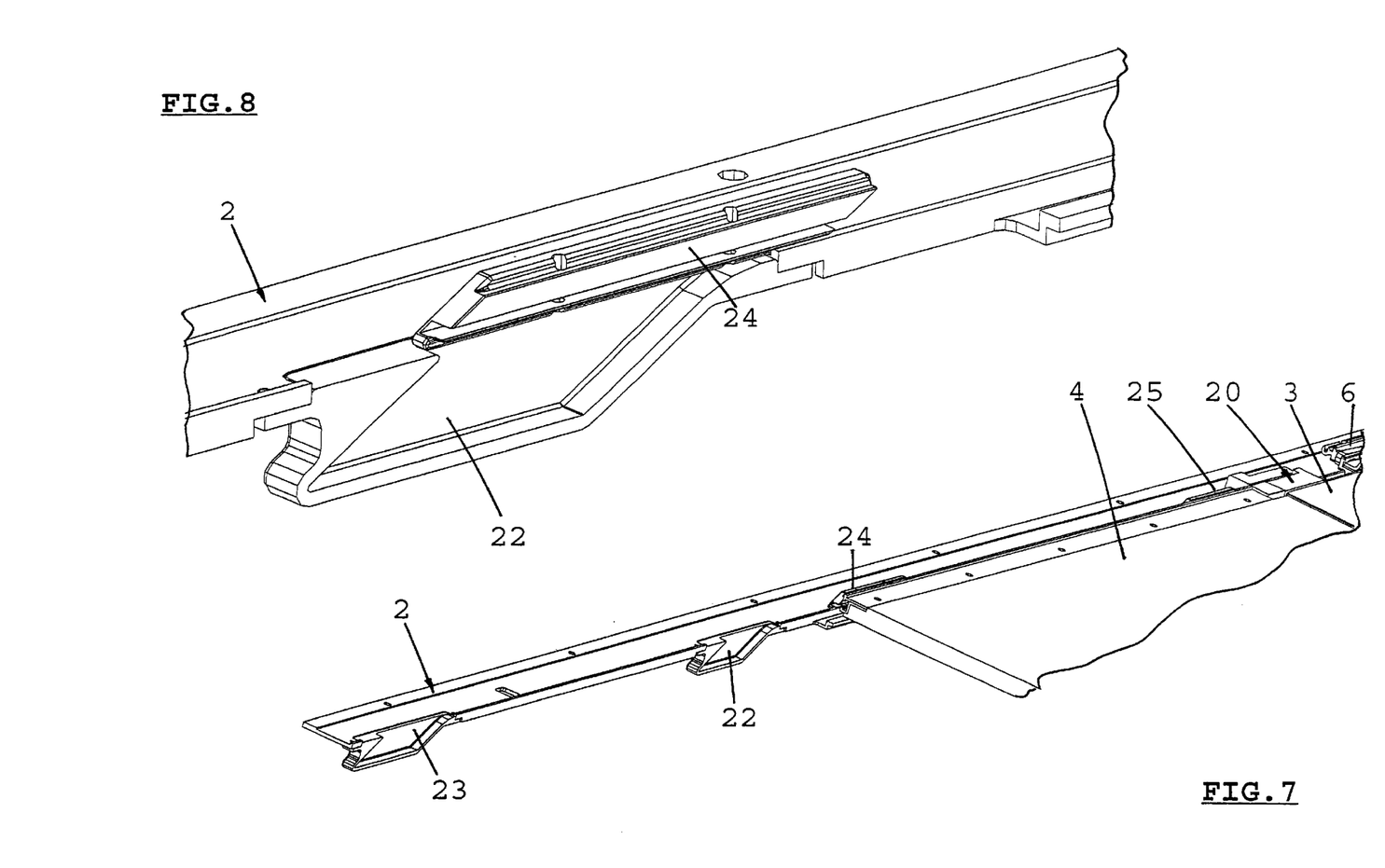
FIG. 7 is a perspective view of a part of the open roof construction comprising lateral guides.
FIG. 8 is a larger-scale, detail view of a lateral guide according to FIG. 7.
Figure 9:
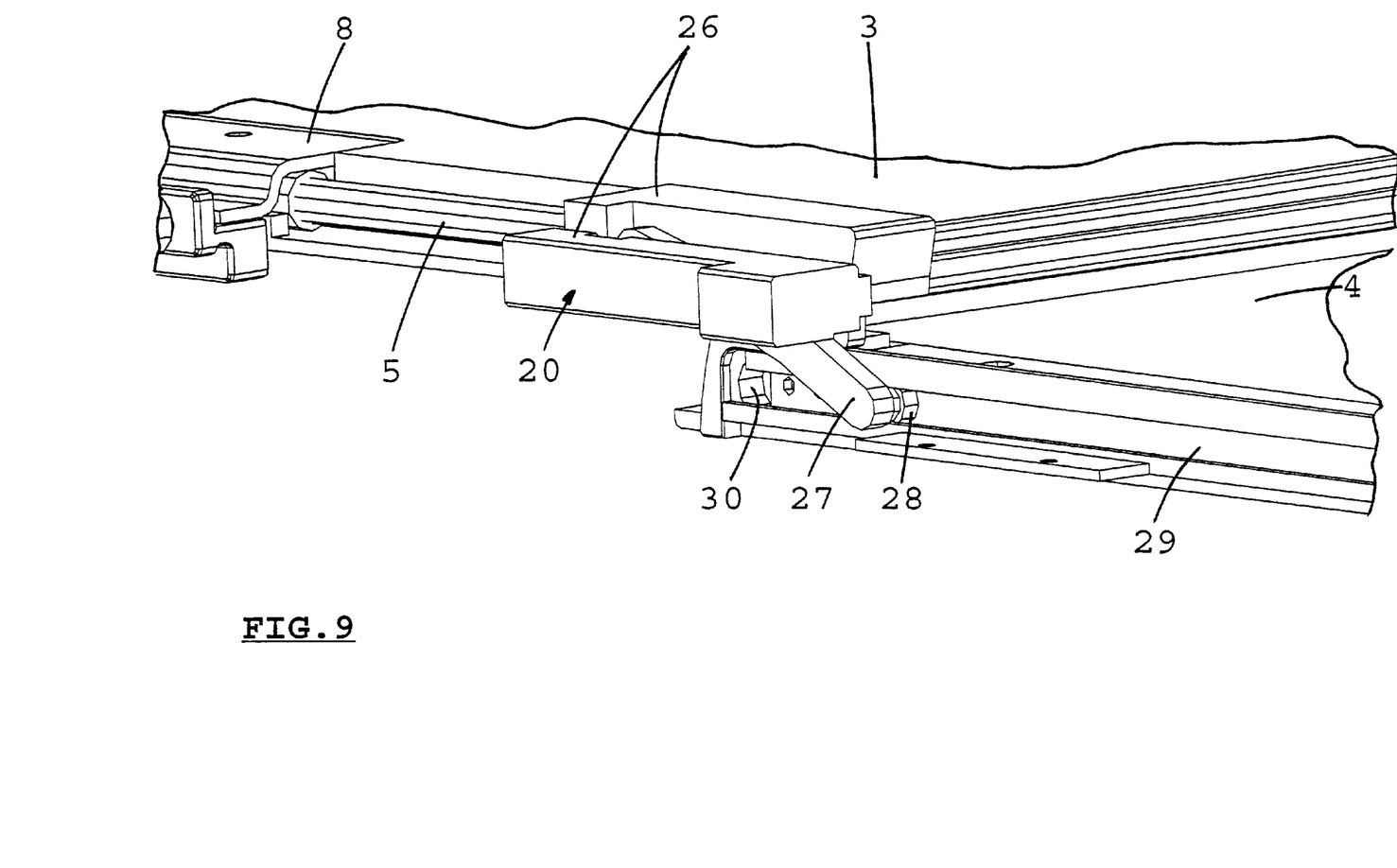
FIG. 9 shows a connecting arm present between two closure elements.
Figure 10:
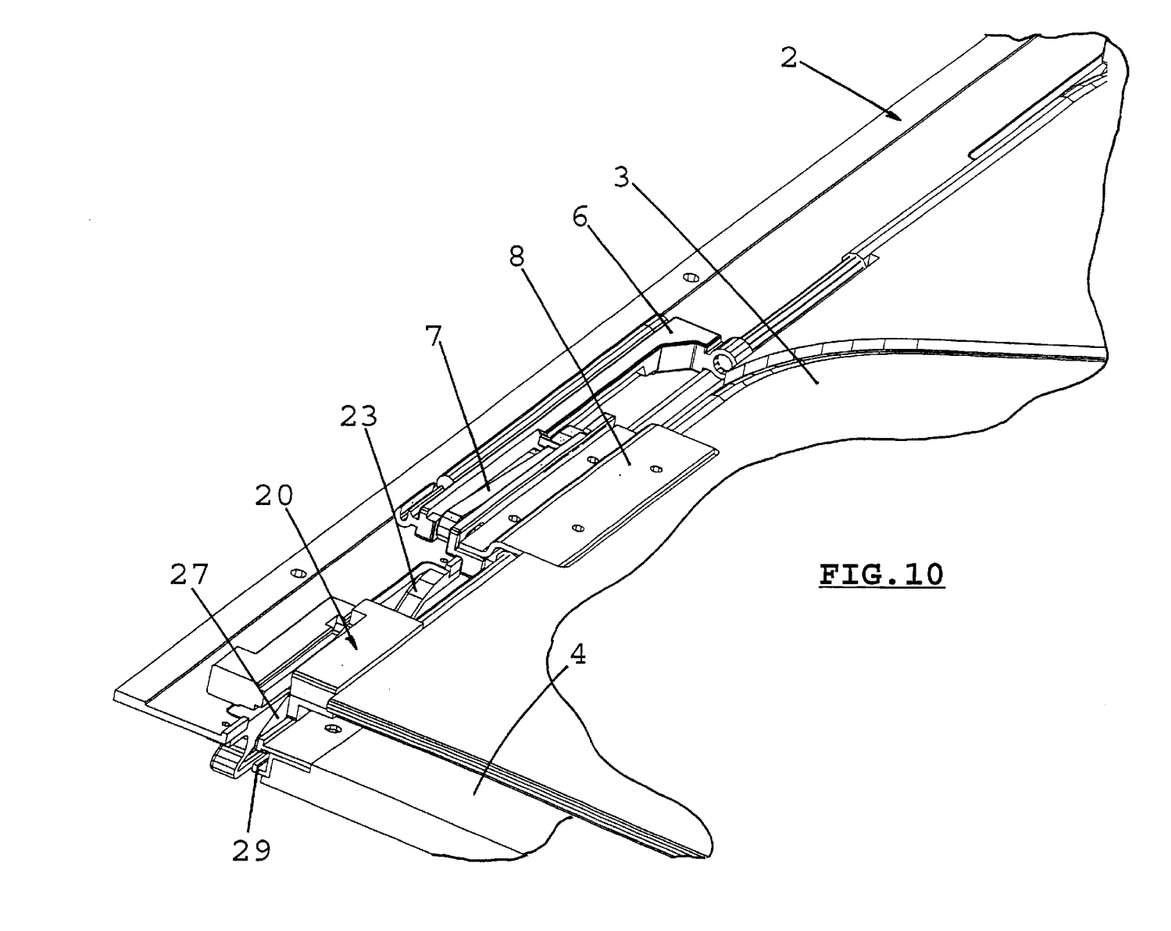
FIG. 10 shows two overlapping closure elements of the open roof construction according to the invention.

Reference is now made to FIGS. 7–10 for a discussion of another aspect of the open roof construction according to the invention. It is noted thereby that FIGS. 7, 8 and 10 show the construction from a different side in comparison with the preceding figures. Thus, the rear closure element 4 is shown on the left in FIG. 7, whilst the front closure element 3 is shown on the right.

Each guide 2 has two lateral guides 22 and 23. Lateral guide 22 is shorter in length than the other lateral guide 23, seen in the longitudinal direction of guide 2. Rear closure element 4 comprises guide shoes 24 and 25 of different length, which correspond to said lateral guides 22 and 23, the longer guide shoe 24 of which is shown on a larger scale in FIG. 8 (in this figure, the rear closure element 4 is not shown for the sake of clarity). Lateral guides 22 and 23 are in the form of inclined recesses, whilst guide shoes 24 and 25 have a corresponding, diamond-shaped contour. When the long guide shoe 24 passes the short lateral guide 22, it cannot be received in said lateral guide. When the long guide shoe 24 reaches the long lateral guide 23, however, said guide shoe will move into said lateral guide. At the same time, the short guide shoe 25 will move into the short lateral guide 22 that corresponds thereto. Generally, such a movement will take place under the influence of the force of gravity, but it is also possible that additional provisions have been made to ensure that the guide shoes will correctly move into the lateral guides (for example in extreme conditions, in which strong vibrations develop in the vehicle).

The object of accommodating the rear closure element 4 in the lateral guides 22 and 23 is to enable the front closure element 3 to move over the rear closure element 4 to a position in which in overlaps said closure element 4. In this manner the closure elements 3,4 take up a compact position, in which they occupy little space, in the position in which they release the roof opening.

Now an additional function of the connecting element 20, by means of which the driving element 5 engages the rear closure element 4 (after being returned in a looped path), becomes apparent. In this connection reference is made in particular to FIG. 9, which is a perspective rear view, seen from the perspective of FIGS. 7 and 8. Connecting element 20 consists of a connecting block 26, in which a connecting arm 27 is pivotally accommodated. The end of said connecting arm 27 engages with a cam 28 in a channel 29, which is formed in the rear closure element 4.

When the rear closure element 4 is accommodated in lateral guides 22 and 23 with its guide shoes 24 and 25, said rear closure element 4 occupies a position as shown in FIG. 9. The front closure element 3 can move to the right (seen in FIG. 9) over said rear closure element 4, whereby cam 28 moves within channel 29. In this way the closure elements 3 and 4 can be moved to a position in which they overlap, as is shown in FIG. 10, for example. During the reverse movement, cam 28 initially moves to the left (seen in FIG. 9) in channel 29, and finally it strikes against a channel end 30 (see FIG. 9). As a result, the rear closure element 4 is pulled out of the lateral guides 22 and 23 in the form of inclined recesses in guide 2, after which said rear closure element 4 moves further together with the front closure element 3.

Finally, reference is made to FIGS. 11–15, which show a wind deflector as used in the open roof construction according to the invention.

Figures 11, 12:
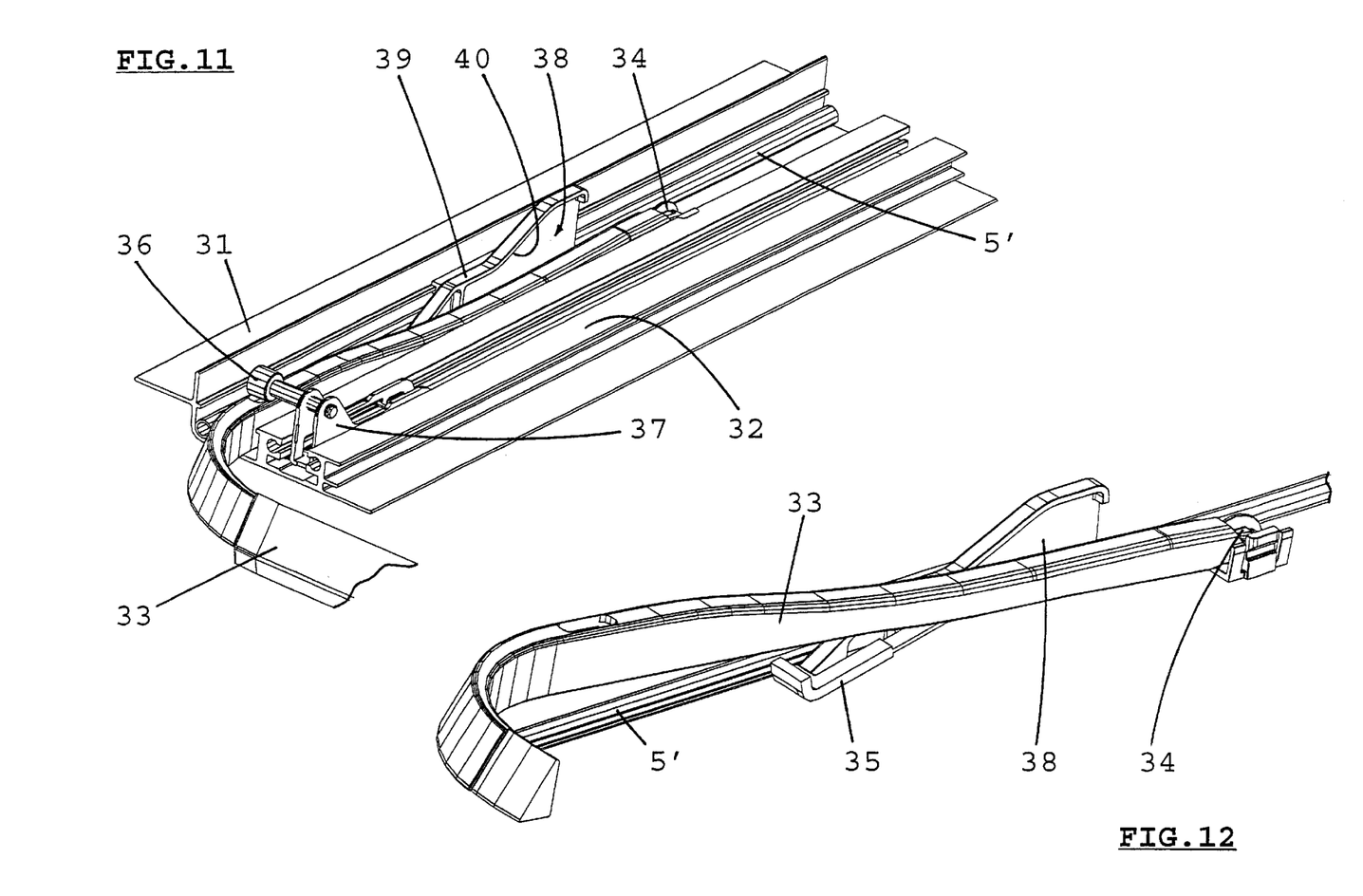
FIG. 11 is a perspective overview of an operating mechanism for a wind deflector used in the open roof construction according to the invention.
FIG. 12 shows a few individual parts of the operating mechanism of FIG. 11.
Figures 13, 14:
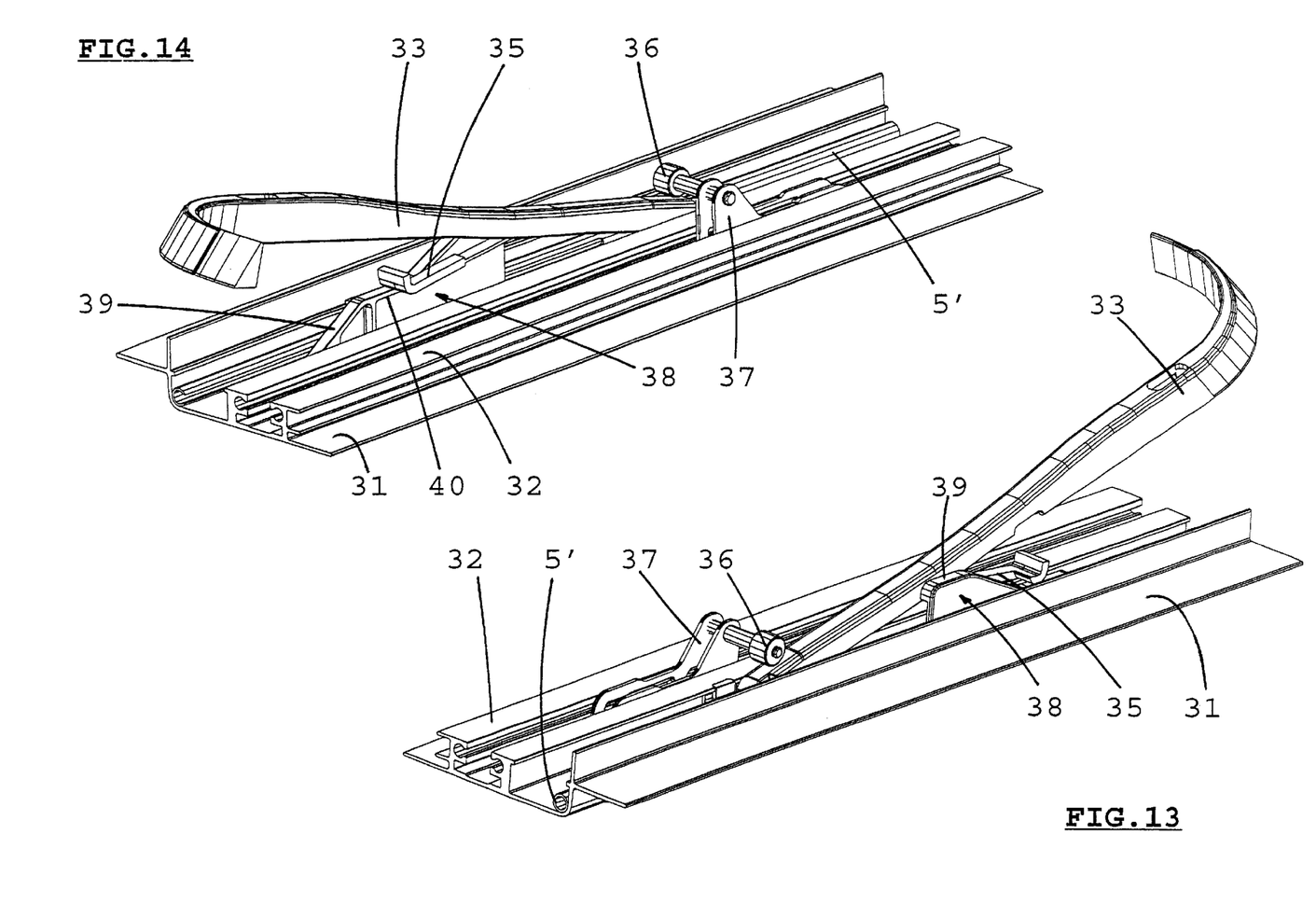
FIG. 13 shows the operating mechanism of FIG. 11 in another position thereof.
FIG. 14 shows the operating mechanism of FIG. 11 in yet another position thereof.
Figure 15:
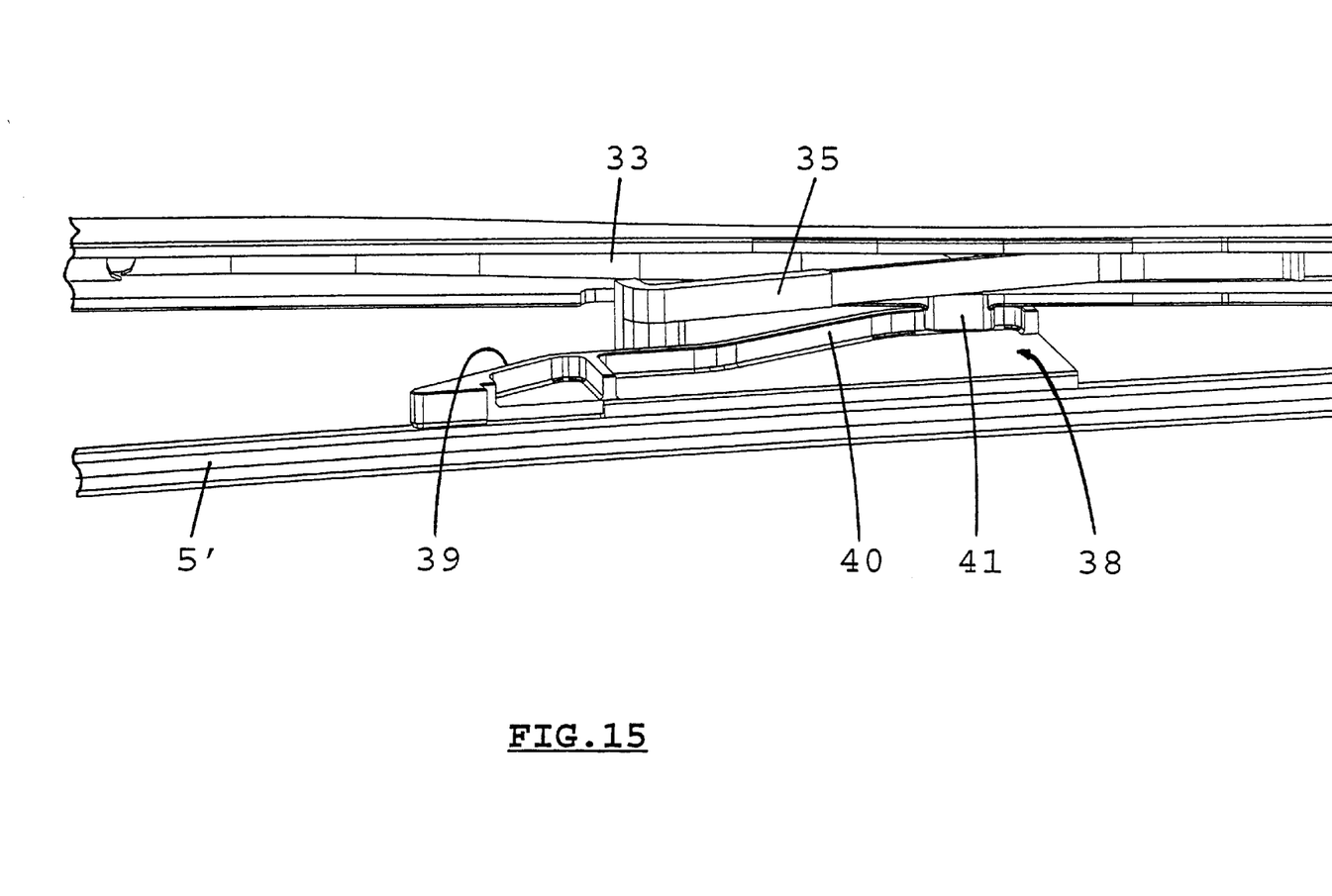
FIG. 15 is a bottom plan view of a part of the operating mechanism of FIG. 11.

Referring to FIG. 11, there is shown a part of the fixed roof construction of a vehicle comprising a guide 32. A wind deflector 33 is pivotally connected to the fixed roof construction 31 at the location of a pivot point 34. Wind deflector 33 comprises a leaf spring 35 at its bottom side (see FIG. 12), which engages the fixed roof construction 31 and which loads the wind deflector 33 in upward direction. A roller 36, which is accommodated in a slide 37 which moves in guide 32, impedes the upward movement of the wind deflector 33, however. Slide 37 is connected to a closing panel (not shown), for example, in such a manner that the slide 37 will move to the right, seen in FIG. 11, when said closing panel is moved to a position in which it releases the roof opening, allowing the wind deflector 33 to pivot upwards under the influence of the spring force from leaf spring 35. Such a situation is shown in FIG. 13 (which is a perspective view from the opposite side).

The wind deflector mechanism furthermore comprises a drivable curved member 38, which can likewise move forward and backward with respect to the fixed roof construction 31 (parallel to slide 37). Said movement of the curved member 38 can be arranged by driving element 5. Referring to FIG. 1, it is for example possible that the end of the driving element (not shown) that is located on the right in said figure makes contact with the curved member 38 when closure elements 3 and 4 are moved to the right to a position in which they release the roof opening 1 (as is for example shown in FIG. 10), in which position it is desirable for the wind deflector 33 to be driven additionally (as will be described yet hereafter).

Curved member 38 comprises a first curved portion 39 on its upper side, which can mate with the end of leaf spring 35. This makes it possible to adjust the spring load that is exerted by leaf spring 35. Curved member 38 furthermore comprises a downwardly extending, second curved portion 40, which mates with a cam 41 disposed on wind deflector 33 (which cam is only shown in the bottom plan view of FIG. 15). When roller 36 is no longer in contact with the wind deflector 33, said cam 41 determines the pivoting angle of the wind deflector 33.

The pivoting angle of the wind deflector 33 is determined by the position of slide 37 during the time roller 36 is in contact with the wind deflector 33. Once the slide 37 has been moved so far that roller 36 is no longer in contact with the wind deflector 33, the pivoting angle of the wind deflector 33 is determined, as already said before, by the mating relationship between the cam 41 thereof and the second curved portion 40 of the curved member 38. The mating relationship between the leaf spring 35 and the first curved portion 39 of curved member 38 thereby determines the spring load that is exerted on wind deflector 33, or, in other words, the force that is required to push the wind deflector 33 down.

The connection between curved member 38 and the driving element 5 can be effected by means of a spring member, so that curved member 38 can be moved against the force of the spring of said spring member for the purpose of demounting the wind deflector 33.

Finally it is noted that numeral 5' in FIGS. 11–15 indicates a guide for driving element 5 (which driving element itself is not shown therein).

The invention is not restricted to the embodiments as described above, which can be varied in several ways without departing from the scope of the invention as defined in the claims.

What is claimed is:

1. An open roof construction for a vehicle having a roof opening formed in the roof of the vehicle, the open roof construction comprising:
   at least one closure element, which is movable along a guide between a position in which it is adapted to close the roof opening and a position in which it releases the roof opening;
   a driving mechanism including a driving source and at least one driving element, which couples said driving source to said closure element, wherein the closure element can be locked in at least one position with respect to said guide, while the driving element can be disconnected from said closure element in said position and be moved with respect thereto for the purpose of driving another element that forms part of the open roof construction; and
   a coupling arm pivotally connected to said closure element with one end and which engages said driving element with its other end, in such a manner that the coupling arm, in a first pivoted position thereof, is substantially rigidly connected to the driving element, while in a second pivoted position of the coupling arm the closure element is fixed in position with respect to said guide, while the driving element becomes movable with respect to the coupling arm and the closure element.

2. The open roof construction according to claim 1, wherein said driving element includes a slide provided with an elongated groove, in which a slide block which is connected to the coupling arm is accommodated, wherein the groove and the slide block are adapted such that movement of the slide block within said groove is not possible in the first pivoted position of the coupling arm, whereas such movement is possible in the second pivoted position.

3. The open roof construction according to claim 2, wherein the coupling arm includes a locking projection, which is moved through said guide for the purpose of defining said first pivoted position, and which is capable of engaging in a locking recess in the open roof construction of the vehicle in said second pivoted position so as to fix the closure element with respect to the guide, wherein the groove of said slide comprises a straight first portion having straight walls, which extends substantially parallel to said guide, and an adjoining second portion having sloping walls, which includes an angle with said straight portion, wherein the slide block is adapted for said second groove portion in the first pivoted position of the coupling arm, being rigidly connected to the slide by the sloping walls thereof, and wherein said slide block is positioned in said first groove portion in said second pivoted position, in which position it is capable of movement between the straight walls thereof.

4. The open roof construction according to claim 3, wherein the coupling arm can also take up a third pivoted position, in which movement of the driving element with respect to the coupling arm and the closure element becomes possible, and in which position the direction of the movement of the driving element on the one hand and the coupling arm and the closure element on the other hand with respect to each other is opposed to the direction of the relative movement of said coupling arm and closure element in the second pivoted position.

5. The open roof construction according to claim 4, wherein the groove comprises two straight groove portions adjoining the second groove portion on opposite sides thereof, wherein the slide block of the coupling arm is present in one straight groove portion in its second pivoted position, while it is present in the other straight groove portion in its third pivoted position.

6. The open roof construction according to claim 5, wherein the locking projection engages a second locking recess in the open roof construction, the second locking recess being spaced apart from the locking recess.

7. The open roof construction according to claim 1 and further comprising a second closure element, which can be driven together with the first closure element by the driving element, and which, in the position in which the first closure element is locked in position with respect to the guide, can be moved with respect to the first closure element by the driving element, which is likewise movable with respect to the first closure element in that position.

8. The open roof construction according to claim 7, wherein the driving element is returned to said second closure element, to which it is connected, in a looped path through said first closure element.

9. The open roof construction according to claim 1, wherein said at least one position is the position in which the closure element closes the roof opening.

10. The open roof construction according to claim 7, wherein the second closure element can be moved from a closing position to a releasing position along the same guide as the first closure element, wherein lateral guides connect to said guides, into which the second closure element can be moved to its releasing position so as to place the two closure elements in an overlapping position adjacently to each other, and wherein the second closure element is connected to the driving element in such a manner that when said second closure element is accommodated in said lateral guides, the driving element can move with respect to the second closure element.

11. The open roof construction according to claim 10, wherein the driving element engages in a channel formed in the second closure element by means of a connecting arm, in such a manner that when the second closure element is positioned in the lateral guides, said connecting arm will move through said channel upon movement of the first closure element to the position in which it overlaps the second closure element, and wherein said connecting arm strikes against a channel end upon movement of the first closure element in the opposite direction, thus carrying the second closure element along with the first closure element.

12. The open roof construction according to claim 10, wherein said lateral guides are formed by two inclined recesses of different length, while the second closure element is fitted with two correspondingly dimensioned guide shoes of different length, wherein said recesses and said guide shoes are so positioned that during movement of the second closure element to the releasing position, the longer guide shoes first pass by the shorter recesses before the longer guide shoes reach the longer recesses and the shorter guide shoes reach the shorter recesses.

13. The open roof construction according to claim 1, wherein said closure element is a sun screen.

14. The open roof construction according to claim 1 and further comprising:

a wind deflector which is pivotable between an inoperative position, in which it lies substantially in the plane of the roof, and an operative position, in which it slopes upwards from said plane, which wind deflector is spring-loaded to the operative position, and which engages, at least in its operative position, a stop which can be moved by the movement of the closure element; and a curved member which can be driven by the driving element, a first curved portion of which mates with a spring member providing said spring load, and a second curved portion of which mates with a cam disposed on the wind deflector, which determines the pivoting angle that is caused by the spring load.

15. The open roof construction according to claim 14, wherein the connection between said driving element and said curved member comprises a spring member.

16. An open roof construction for a vehicle having a roof opening formed in the roof of the vehicle, the open roof construction comprising first and second closure elements, which are movable along a guide between a position in which they are adapted to close the roof opening and a position in which they are adapted to release the roof opening, wherein the first and second closure elements can be moved from the closing position to the releasing position along the same guide as the first closure element, wherein lateral guides connect to said guide, into which one of the closure elements can be moved to its releasing position so as to place the first and second closure elements in an overlapping position adjacently to each other, and wherein the first closure element is connected to a driving element in such a manner that when the first closure element is accommodated in said lateral guides, the driving element can move with respect to the first closure element.

17. The open roof construction according to claim 16, wherein the driving element engages in a channel formed in the second closure element by means of a connecting arm, in such a manner that when the second closure element is positioned in the lateral guides, said connecting arm will move through said channel upon movement of the first closure element to the position in which it overlaps the second closure element, and wherein said connecting arm strikes against a channel end upon movement of the first closure element in the opposite direction, thus carrying the second closure element along with the first closure element.

18. The open roof construction according to claim 16, wherein said lateral guides are formed by two inclined recesses of different length, while the second closure element is fitted with two correspondingly dimensioned guide shoes of different length, wherein said recesses and said guide shoes are so positioned that during movement of the second closure element to the releasing position, the longer guide shoes first pass by the shorter recesses before the longer guide shoes reach the longer recesses and the shorter guide shoes reach the shorter recesses.

19. An open roof construction for a vehicle having a roof opening formed in the roof of the vehicle, the open roof construction comprising:

at least one closure element, which is movable along a guide between a position in which it is adapted to close the roof opening and a position in which it is adapted to release the roof opening;

a driving mechanism including a driving source and at least one driving element which couples said driving source to said closure element;

a wind deflector which is pivotable between an inoperative position, in which it lies substantially in the plane of the roof, and an operative position, in which it slopes upwards from said plane, which wind deflector is spring-loaded to the operative position, and which engages, at least in its operative position, a stop which can be moved by the movement of the closure element; and a curved member which can be driven by the driving element, a first curved portion of which mates with a spring member providing said spring load, and a second curved portion of which mates with a cam disposed on the wind deflector, which determines the pivoting angle that is caused by the spring load.

* * * * *

UNITED STATES PATENT AND TRADEMARK OFFICE
CERTIFICATE OF CORRECTION

PATENT NO. : 6,652,023 B2
DATED : November 25, 2003
INVENTOR(S) : Manders et al.

It is certified that error appears in the above-identified patent and that said Letters Patent is hereby corrected as shown below:

<u>Title page,</u>
Item [30], should read as follows:

-- [30] Foreign Application Priority Data

Apr. 3, 2001    European Patent Application    01201206 --

<u>Column 10,</u>
Line 44, "from the locking recess." should be -- from the first locking recess. --

Signed and Sealed this

Twenty-seventh Day of July, 2004

JON W. DUDAS
*Acting Director of the United States Patent and Trademark Office*